United States Patent Office

2,702,740
Patented Feb. 22, 1955

2,702,740

METHOD FOR PREPARING CALCIUM HYDRIDE

Robert C. Wade, Ipswich, and Peter P. Alexander, Beverly, Mass., assignors to Metal Hydrides Incorporated, Beverly, Mass., a company of Massachusetts No Drawing. Application October 2, 1953, Serial No. 383,910

4 Claims. (Cl. 23—204)

This invention relates to the production of calcium hydride by conversion of calcium chloride with sodium metal and hydrogen.

The copending application of Peter P. Alexander, Serial No. 383,929 filed October 2, 1953, describes a two-stage method for producing calcium hydride by reacting anhydrous calcium chloride or other halide with sodium metal in the presence of hydrogen. In the first stage of the preferred method described in that application anhydrous finely divided calcium chloride is heated in a confined reaction zone in an atmosphere of hydrogen at a temperature at which sodium metal absorbs hydrogen to form sodium hydride, for example, between about 250° C. and 375° C. Sodium metal is added in small amounts with agitation of the mixture, the sodium metal being added at intervals to permit each small amount of sodium metal to melt and coat the calcium chloride and react. After the desired amount of sodium metal has been added and hydrogen ceases to be absorbed, a reaction mixture results which comprises sodium hydride, calcium hydride, sodium chloride and unconverted calcium chloride. In the second stage of the method described in the above mentioned application agitation is discontinued and the temperature of the reaction zone is raised to a temperature between the dissociation temperature of sodium hydride and slightly less than that which causes fusion of the reaction mixture, namely, about 640° C., to complete the conversion of the calcium chloride to calcium hydride.

The present invention provides a single stage method for the production of calcium hydride by conversion of calcium chloride with sodium metal and hydrogen. The present invention is based in part upon the discovery that when anhydrous calcium chloride is agitated and heated to a temperature of about 385° C. or higher but below its fusion temperature some change takes place in the excess of calcium chloride present causing it to roll up to form hard non-reactive balls.

In accordance with the method of the present invention a finely divided solid, which is substantially inert toward sodium metal, calcium hydride and hydrogen and the reaction products thereof, is added as a "heel" to a confined reaction zone containing an atmosphere of hydrogen. A suitable inert solid is the reaction mixture produced by either the first or second stage of the method described in the above mentioned copending application or the reaction mixture produced by the method of the present invention. Other suitable solids are, for example, sodium chloride, calcium hydride, etc. The reaction zone is heated to a temperature above about 385° C. and preferably above the temperature at which sodium hydride begins to dissociate. Anhydrous calcium chloride and sodium metal are added in small portions to the reaction zone with continuous agitation. The amounts of calcium chloride and sodium metal thus added should be sufficient to react with hydrogen to form calcium hydride and sodium chloride without accumulation of a large excess of calcium chloride in the reaction zone and thus maintain a freely stirrable solid therein. The reaction zone is maintained at a temperature above about 385° C. but below the melting temperature of calcium chloride and the chloride mixture present during the reaction and preferably between about 420° C. and 600° C.

After each addition of a small amount of calcium chloride and sodium metal, hydrogen is absorbed and the reaction takes place rapidly. When the desired amounts of calcium chloride and sodium metal have been added and absorption of hydrogen has ceased, the reaction is complete. If stoichiometric amounts of calcium chloride and sodium metal are used, the reaction mixture consists essentially of calcium hydride and sodium chloride. The pressure of hydrogen in the reaction zone is maintained sufficient to prevent leakage of air thereinto, a pressure of about one atmosphere being suitable. A higher pressure of hydrogen may be maintained in the reaction zone if desired but is not necessary.

The sodium chloride may be removed from the reaction mixture thus produced by treating it with a solvent for sodium chloride which is substantially inert toward calcium hydride to form a liquor comprising a solution of sodium chloride and solid calcium hydride. The solid calcium can be removed from the solution as by filtration.

While the invention is directed particularly to the production of calcium hydride, it is applicable for the production of hydrides of other alkaline earth metals, such as barium and strontium by replacing the calcium chloride by barium chloride or strontium chloride. Similarly, the chlorides of these metals may be replaced by other halides, such as the iodide, fluoride or bromide.

The invention is illustrated further by the following specific example. A reaction vessel was set up with a close fitting sweep type stirrer. To this was charged 294 grams of a mixture of 25% calcium hydride and 75% sodium chloride as a "heel." The vessel was evacuated and filled with hydrogen, provision being made for maintaining a hydrogen pressure of about one atmosphere. Stirring was started and the reactor and contents heated to 420°–450° C. The bed of solids stirred easily and remained light and free flowing. Then over a period of 250 minutes a total of 184 grams of sodium metal and 448 grams of anhydrous calcium chloride were added in small increments alternately. Reaction occurred rapidly with each addition of sodium and calcium chloride. Hydrogen was added as rapidly as it was absorbed. Care was taken that no substantial excess of unreacted calcium chloride was allowed to accumulate in the reactor. This was accomplished by adding sodium metal and calcium chloride in approximately equivalent amounts with each addition. When the reaction was complete and no more hydrogen was absorbed, the product was discharged. This product analyzed 0.05% sodium hydride and 25.2% calcium hydride representing a conversion of 99.8 per cent of theory. Recovery was 100%. A 10 gram sample was extracted with 500 ml. of anhydrous liquid ammonia at minus 28 to minus 33° C. The slurry was stirred for 15 minutes and allowed to settle for 5 minutes. The supernatant solution of sodium chloride was filtered off by an upward decantation-filtration. The product was washed a second time with 200 ml. of anhydrous liquid ammonia and filtered as previously described. 2.5 grams of calcium hydride was recovered which analyzed 84% calcium hydride. 7.25 grams of sodium chloride was recovered from the liquid ammonia extract.

We claim:
1. The method for producing calcium hydride which comprises adding to a confined reaction zone containing an atmosphere of hydrogen anhydrous calcium chloride and sodium metal in small portions such as to maintain a freely flowable solid in the reaction zone and to react with the hydrogen to form a reaction mixture comprising calcium hydride and sodium chloride, continuing the addition of said portions until the desired amounts of calcium chloride and sodium metal have been added, stirring the charge in the reaction zone until the absorption of hydrogen ceases, maintaining the reaction zone at a temperature between about 385° C. and the melting temperature of calcium chloride and the chloride mixture present during the reaction, and introducing into said reaction zone a substantially inert finely divided solid prior to the addition of said portions of calcium chloride and sodium metal.

2. The method for producing calcium hydride which comprises adding to a confined reaction zone containing an atmosphere of hydrogen anhydrous calcium chloride and sodium metal in small portions such as to maintain a freely flowable solid in the reaction zone and to react with the hydrogen to form a reaction mixture comprising calcium hydride and sodium chloride, continuing the addition of said portions until the desired amounts of calcium chloride and sodium metal have been added, stirring the charge in the reaction zone until the absorption of hydrogen ceases, maintaining the reaction zone at a temperature between about 420° C. and 600° C., and introducing into said reaction zone a substantially inert finely divided solid prior to the addition to said portions of calcium chloride and sodium metal.

3. The method for producing calcium hydride which comprising adding to a confined reaction zone containing an atmosphere of hydrogen anhydrous calcium chloride and sodium metal in small portions such as to maintain a freely flowable solid in the reaction zone and to react with the hydrogen to form a reaction mixture comprising calcium hydride and sodium chloride, continuing the addition of said portions until the desired amounts of calcium chloride and sodium metal have been added, stirring the charge in the reaction zone until the absorption of hydrogen ceases, maintaining the reaction zone at a temperature between about 385° C. and the melting temperature of calcium chloride and the chloride mixture present during the reaction, and introducing into said reaction zone a substantially inert finely divided solid prior to the addition of said portions of calcium chloride and sodium metal, said inert solid being a product of the reaction of a calcium halide, sodium metal and hydrogen at a temperature between that at which sodium metal absorbs hydrogen to form sodium hydride and the melting temperature of the halide mixture present during such reaction.

4. The method for producing calcium hydride which comprises adding to a confined reaction zone containing an atmosphere of hydrogen anhydrous calcium chloride and sodium metal in small portions such as to maintain a freely flowable solid in the reaction zone and to react with the hydrogen to form a reaction mixture comprising calcium hydride and sodium chloride, continuing the addition of said portions until the desired amounts of calcium chloride and sodium metal have been added, stirring the charge and the reaction zone until the absorption of hydrogen ceases, maintaining the reaction zone at a temperature between about 420° C. and 600° C., and introducing into said reaction zone a substantially inert finely divided solid prior to the addition of said portions of calcium chloride and sodium metal, said inert solid being a product of the reaction of a calcium halide, sodium metal and hydrogen at a temperature between that at which sodium metal absorbs hydrogen to form sodium hydride and the melting temperature of the halide mixture present during such reaction.

No references cited.